United States Patent [19]

Hansen

[11] Patent Number: 5,401,174
[45] Date of Patent: Mar. 28, 1995

[54] UNIVERSAL CHARGE PORT CONNECTOR FOR ELECTRIC VEHICLES

[75] Inventor: David B. Hansen, Beverly Hills, Mich.

[73] Assignee: Chrysler Corporation, Highland Park, Mich.

[21] Appl. No.: 219,981

[22] Filed: Mar. 30, 1994

[51] Int. Cl.$^6$ ............................................. H01R 13/74
[52] U.S. Cl. ..................................... 439/34; 439/557; 180/65.1
[58] Field of Search ............................ 439/34, 35, 557; 296/97.22; 180/65.1

[56] References Cited

U.S. PATENT DOCUMENTS

| | | | |
|---|---|---|---|
| 3,270,267 | 8/1966 | Nolte, Jr. | 439/34 |
| 3,813,632 | 5/1974 | Drewry | 439/34 |
| 3,915,476 | 10/1975 | Burkle | 439/34 |

FOREIGN PATENT DOCUMENTS 2039165  7/1980  United Kingdom .................. 439/35

Primary Examiner—Gary F. Paumen
Attorney, Agent, or Firm—Mark P. Calcaterra

[57] ABSTRACT

An on-board charge port connector for an electrical vehicle positioned within an opening in the vehicle body. The on-board connector includes an electrical unit having a housing and a plurality of terminal pins. The electrical unit is inserted into a backside opening in a modular unit in a snap-type engagement. The modular unit is secured to the opening in the vehicle's body. A lip portion radially extending from an end of the modular unit opposite to the end through which the electrical unit was inserted seats against an outer surface of a rim portion of the vehicle body defining the opening. A plurality of biasing members are secured to the modular unit so that they contact an inside surface of the rim portion. A cap is threadably engageable within the modular unit so as to enclose the terminal pins.

18 Claims, 1 Drawing Sheet

UNIVERSAL CHARGE PORT CONNECTOR FOR ELECTRIC VEHICLES

BACKGROUND AND SUMMARY OF THE INVENTION

This invention relates generally to an on-board charge port connector for an electrical vehicle and, more particularly, to a modular, universal on-board charge port connector that is adaptable to be mounted into fuel filler openings within the body of internal combustion engine vehicles being used as electrical vehicle bodies.

The ability of on-board battery packs associated with electrical vehicles to effectively and efficiently provide the necessary power to propel the vehicle is a major concern in electrical vehicle technology. As battery packs and associated control circuitry for electrical vehicles become increasingly more sophisticated, electrical vehicles are becoming a more likely alternative to the more popular internal combustion engine vehicle. However, electric vehicles require regular charging of their on-board battery packs in order to maintain the battery packs at a charge sufficient to provide the necessary power to operate the vehicle.

An electric vehicle will include a power cable electrically connected to the vehicle's battery pack at one end of the cable and electrically connected to an on-board charge port connector at the end of the power cable opposite to the battery pack in order to deliver charge to the battery pack. When the vehicle operator wishes to charge the on-board battery pack, the vehicle operator will connect a charging connector associated with an appropriate charging power source to the on-board charge port connector so as to apply either an AC or DC charging current to the battery pack. Generally, the on-board charge port connector is rigidly mounted within an opening in the vehicle body to make it accessible to the charging connector. Because the vehicle bodies of internal combustion engine vehicles are also used as the vehicle bodies for electrical vehicles, it has been suggested to mount the on-board charge port connector within the fuel filler opening already present in the electric vehicle body.

The fuel filler opening for different vehicle bodies have different sizes and configurations. Therefore, on-board charge port connectors must also vary in size to fit these openings. However, it would be much more cost effective if charge port connectors could be standardized in size and shape. What is needed then is an on-board charge port connector for an electric vehicle which can be standardized for the fuel filler opening for all vehicle bodies. It is therefore an object of the present invention to provide such a charge port connector for an electric vehicle.

In accordance with the teachings of the present invention, a modular unit and associated on-board charge port connector adaptable to be secured within a fuel filler opening in a vehicle body is disclosed. The modular unit includes an internal bore that accepts the charge port connector in a snap-type fit. The charge port connector is inserted into the modular unit seats against a ring flange within the internal bore. The modular unit includes a lip portion that seats against an outside surface along the rim of the fuel filler opening. A series of biasing members seat against an inside surface of the rim of the fuel filler opening such that the modular unit is held firmly in place in the opening. A portion of the internal bore of the modular unit includes a threaded section so as to threadably accept a cap for enclosing the terminals of the connector. In this arrangement, the sealing cap can be secured within the fuel filler opening behind the fuel filler door.

Additional objects, advantages and features of the present invention will become apparent from the following description and appended claims, taken in conjunction with the accompanying drawings.

DETAILED DESCRIPTION OF THE PREFERRED EMBODIMENTS

The following discussion of the preferred embodiments concerning a modular unit and associated on-board charge port connector for an electrical vehicle is merely exemplary in nature and is in no way intended to limit the invention or its applications or uses.

Vehicle bodies used for vehicles having internal combustion engines requiring fuel filler inlets are also being used as vehicle bodies for electrical vehicles. Obviously, electrical vehicles do not require fuel intake, but do require charging of their on-board battery pack. Therefore, present day electrical vehicles incorporate an on-board charge port connector which is adaptable to be engaged in an electrical connection with a charging connector so as to enable the on-board battery pack to be recharged. It has been suggested that these on-board charge port connectors be mounted within the opening that would normally be used for fuel intake for the internal combustion engine vehicle. Because the fuel filler openings within vehicle bodies may vary in size and configuration, the on-board charge port connector has to vary to fit within the opening.

Figure 1:
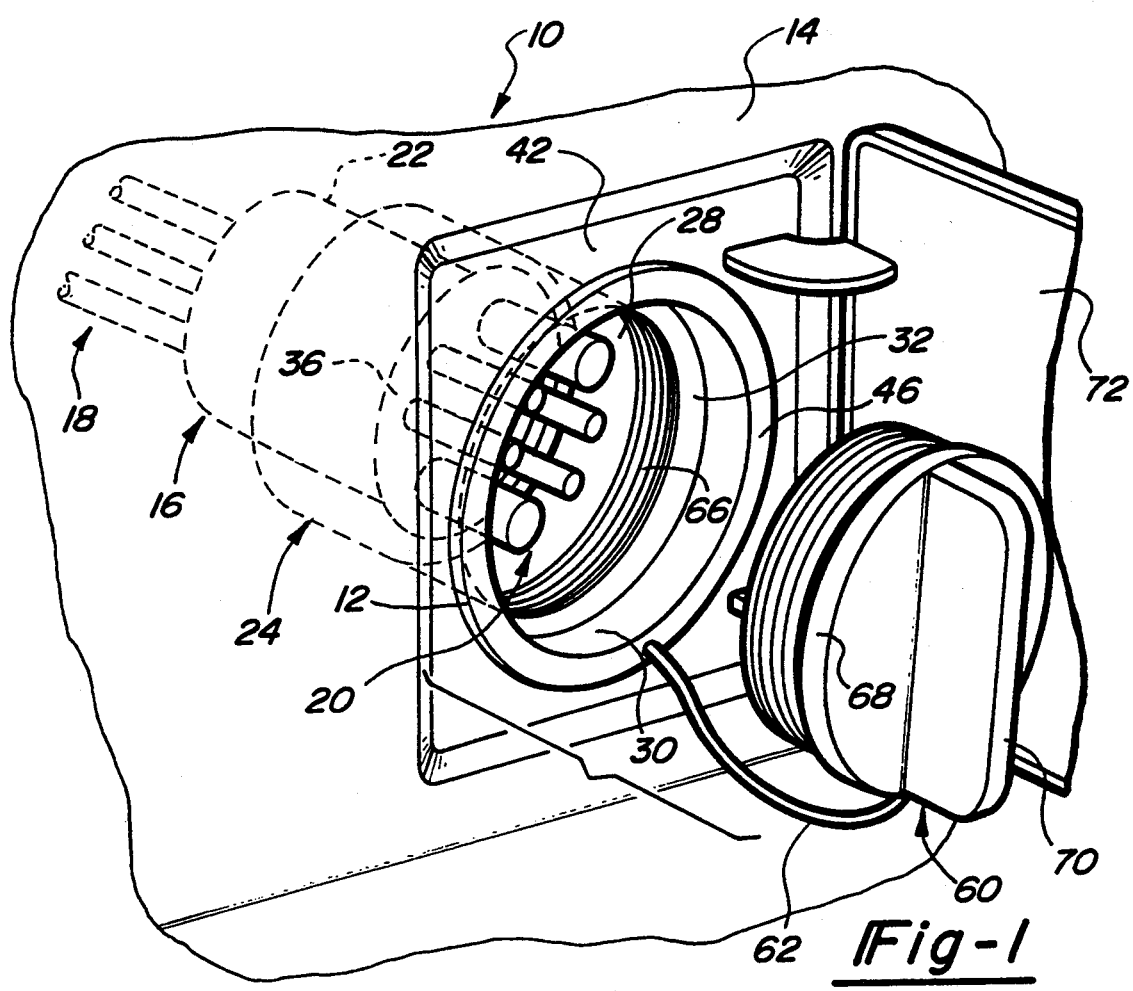
FIG. 1 is a perspective view of a modular unit and associated on-board charge port connector positioned within a fuel filler opening of a vehicle body according to a preferred embodiment of the present invention.

FIG. 1 shows an on-board charge port connector assembly 10 for an electrical vehicle positioned within an opening 12 extending through a vehicle body part 14. The opening 12 could be used as a fuel filler opening for a vehicle having an internal combustion engine. The on-board charge port connector assembly 10 includes an electrical connector 16 connected to a series of electrical wires 18 that are electrically connected to an on-board rechargeable battery pack (not shown). The ends of the electrical wires 18 are connected to a series of terminal pins 20 within a cylindrical insulative housing 22 of the electrical connector 16. The terminal pins 20 extend from the housing 22 and are directed towards the outside of the vehicle. The terminal pins 20 are adaptable to be electrically mated with a series of female terminals of a charging connector (not shown) so as to provide charging of the battery pack when necessary. The electrical connector 16 includes six terminal pins 20. As is well understood in the art, two of the pins 20 are for AC charging, two of the pins 20 are for fast DC charging, one of the pins 20 is a ground connection, and the remaining pin 20 is a pilot pin for detecting discontinuities in the charge flow for safety purposes. In order to satisfy set safety standards, the fast DC charging pins 20 are of a larger size than the remaining pins 20.

Figure 2:
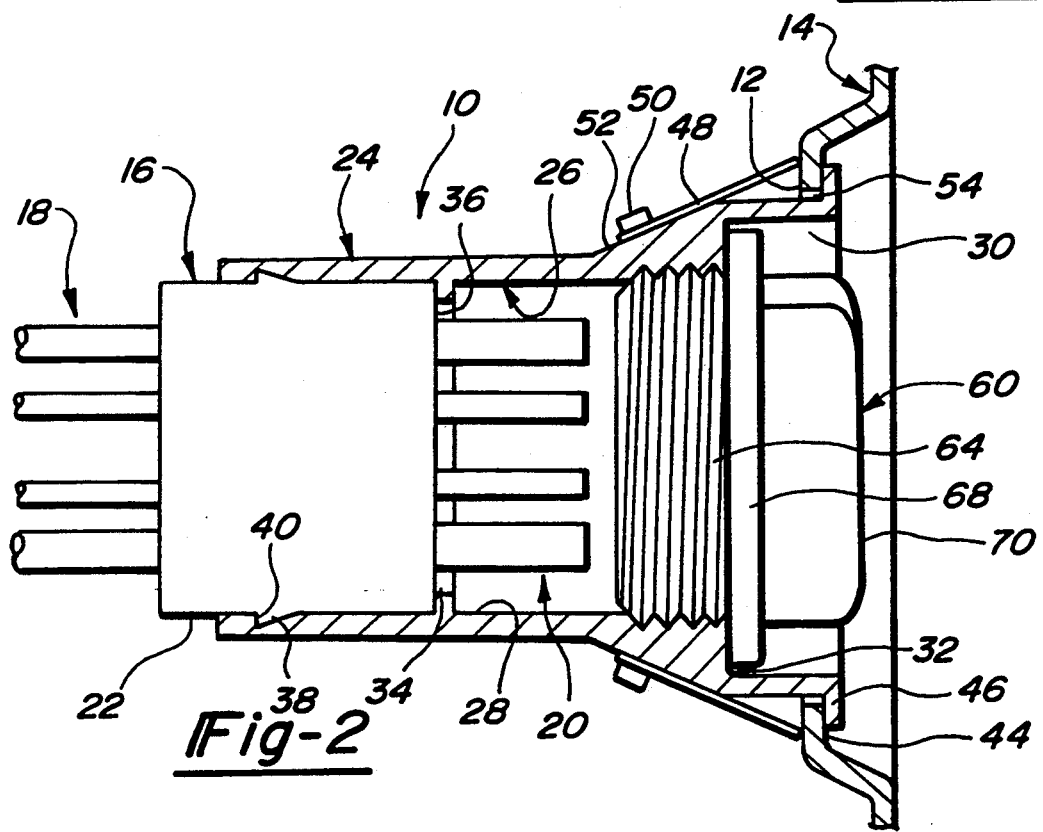
FIG. 2 is a cross sectional side view of the modular unit and charge port connector of FIG. 1 within the fuel filler opening.

The connector assembly 10 includes a modular unit 24 secured within the opening 12 according to a preferred embodiment of the present invention. FIG. 2 shows a cross-sectional view of the modular unit 24 within the opening 12. The modular unit 24 includes a cylindrical internal bore 26 running through the entire length of the unit 24. The internal bore 26 has a first bore portion 28 of a first diameter and a second bore portion 30 of a second larger diameter. The second bore portion 30 is proximate to the opening 12 and is thus closest to the outside of the vehicle. The different bore diameters between the first bore portion 28 and the second bore portion 30 forms a shoulder 32 facing towards the outside of the vehicle. The first bore portion 28 has a diameter that will receive the housing 22 in a friction type engagement as shown. The housing 22 is slid into the bore portion 28 at an end of the unit 24 opposite to the opening 12 such that the terminal pins 20 extend towards the opening 12. A circumferential ring flange 34 is attached to the first bore portion 28 at a desirable position in order to seat against a front face 36 of the housing 22 so as to position the connector 16 at a desirable location within the unit 24. When the front face 36 contacts the flange 34 a series of wedge members 38 integral with the housing 22 engage appropriately shaped openings 40 in the bore portion 28 in a snap-type fit engagement.

As is apparent by viewing FIGS. 1 and 2, the body part 14 includes a recessed area 42 through which the opening 12 is defined. The modular unit 24 is secured to a rim area 44 of the opening 12 in the recessed area 42. A lip portion 46 extends radially out from the end of the modular unit 24 opposite from the connector 16. A back surface of the lip portion 46 seats against an outside surface of the rim area 44 as shown. A plurality of resilient biasing members 48 are secured by some appropriate fastening device 50, to an angled outer surface area 52 of the modular unit 24 proximate the shoulder portion 32, as shown. The biasing members 48 extend toward the lip portion 46 and away from the modular unit 24, and contact an inside surface of the rim area 44 of the recessed area 42 in a snug and rigid engagement so as to secure the modular unit 24 within the opening 12. In a preferred embodiment, three equidistant biasing members 48 are used, however, more biasing members 48 can be incorporated. A resilient member 54 surrounds the rim area 44 in order to provide a resilient contact between the external wall of the bore portion 30 and the rim area 44.

The configuration as discussed above enables the modular unit 24 to be inserted into the opening 12 from an outside location. In other words, the bore portion 28 is first inserted into the opening 12 from outside the vehicle body part 14. As the modular unit 20 is increasingly inserted within the opening 12, the biasing members 48 will eventually contact the rim area 44 of the recessed area 42 at the opening 12. The biasing members 48 will flex towards the modular unit 24 under the insertion force. Once the biasing members 48 have cleared the rim area 44, they will spring back to their original position and contact an inside surface of the rim area 44 of the recessed area 42. At this time, the lip portion 46 will have contacted the outside surface of the rim area 44. Therefore, the modular unit 24 is easily and securely positioned within the opening 12.

The modular unit 24 provides a mechanism for securing the electrical connector 16 within the opening 12 for charging purposes. Because different vehicle bodies will have different sized and configured openings 12, the modular unit 24 provides an easy mechanism for securing a standard sized on-board charge port connector within a variety of different sized and configured openings 12. In this regard, the modular unit 24 will have a standard size internal bore 28 in order to accept a standard size connector 16, but will come in different sized internal bores 30 in order to fit within different sized fuel filler openings.

As with fuel filler openings for vehicles having internal combustion engines, the on-board charge port connector assembly 10 includes a threaded connector cap 60 which prevents moisture and other environmental conditions from contacting the terminal pins 20 when the battery pack is not being charged. In the embodiment shown in FIG. 1, the cap 60 is tethered to the lip portion 46 by an appropriate connector such as a cord 62. However, tethering the cap 60 to the vehicle body part 14 is not necessary in that the cap 60 can be loose. The cap 60 includes an extended portion 64 having external threads. The extended portion 64 is threadably engageable to an internal threaded portion 66 of the modular unit 24 adjacent to the shoulder 36. The cap 60 is shown threadably engaged with the modular unit 24 in FIG. 2. When the cap 60 is connected to the modular unit 24, a rim 68 of the cap 60 seats against the shoulder 36. Also, when the cap 60 is threadably engaged to the modular unit 24, a handle 70 of the cap 60 will not extend beyond the recessed area 42. Such a configuration enables a hinged door 72 associated with the vehicle part 14 to close off the recessed area 42 in the same manner as with internal combustion engine vehicle bodies.

In a preferred embodiment, the entire modular unit 24 is die cast aluminum so as to provide the strength and durability necessary for a wide variety of weather conditions. For this reason, the biasing members 48 are secured to the modular unit 24 by means of the fastening devices 50. However, it is within the spirit and scope of the invention to provide a plastic modular unit 24. In this alternate configuration, the biasing members 48 could be plastic parts formed integral with the modular unit 20.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A modular unit adaptable to be secured within an opening in a body part of an electrical vehicle, said modular unit accepting an electrical connector having terminals electrically connected to a battery pack associated with the vehicle, said modular unit comprising:

a first portion at one end of the modular unit, said first portion having a first internal bore, said first internal bore accepting the electrical connector;

a second portion at an opposite end of the modular unit from the first portion, said second portion having a second internal bore, said second internal bore having a diameter larger than the diameter of the first internal bore, wherein a shoulder is formed between the first internal bore and the second internal bore;

a lip portion radially extending from the second portion, said lip portion adaptable to engage an outer surface of a rim area defining the opening in the vehicle body part; and a plurality of resilient members, each of the resilient members being rigidly secured to an outer surface of the modular unit and being adaptable to contact an inner surface of the rim area defining the opening so as to securely hold the modular unit within the opening.

2. The modular unit according to claim 1 wherein the first internal bore includes a threaded portion proximate the shoulder, said threaded portion receiving a threaded cap so as to enclose the terminals of the connector.

3. The modular unit according to claim 1 wherein the first internal bore includes a ringed tab circumferentially positioned within the first bore, said ringed tab receiving a front surface of a housing associated with the electrical connector so as to position the connector within the modular unit at a desirable location.

4. The modular unit according to claim 1 wherein the plurality of resilient members are secured to the modular unit by a fastening device.

5. The modular unit according to claim 1 wherein the first internal bore accepts the electrical connector in a snap-type fit.

6. The modular unit according to claim 1 wherein the modular unit is die cast aluminum.

7. The modular unit according to claim 1 wherein the modular unit is plastic.

8. An on-board charge port connector assembly for charging a battery pack associated with an electrical vehicle, said on-board connector assembly being rigidly secured within an opening in a body part of the vehicle, said on-board connector assembly comprising:

an electrical connector, said electrical connector including a series of electrical terminals, said electrical terminals being connected to a series of electrical wires, said electrical wires being connected to the battery pack; and a modular unit secured within the opening in the body part, said modular unit including an internal bore, said internal bore receiving the electrical connector in a secure engagement such that the terminals extend toward the opening, said modular unit further including means for rigidly securing the modular unit to a rim area of the body part defining the opening.

9. The connector assembly according to claim 8 wherein the means for rigidly securing includes a lip portion radially extending from an edge of one end of the modular unit and a plurality of biasing members, wherein the lip portion rides against an outer surface of the rim area and each of the biasing members are in contact with an inner surface of the rim area so as to secure the on-board charge port connector assembly within the opening.

10. The connector assembly according to claim 8 wherein the internal bore includes a tabbed portion circumferentially positioned within the bore, said tabbed portion receiving a front surface of the electrical connector so as to position the electrical connector within the modular unit at a desirable location.

11. The connector assembly according to claim 8 wherein the internal bore includes a first internal bore portion having a first diameter and a second internal bore portion having a second diameter wherein the second diameter is larger than the first diameter so as to form a shoulder therebetween.

12. The connector assembly according to claim 8 wherein the internal bore includes a threaded portion, said threaded portion receiving a threaded cap so as to enclose the terminals of the electrical connector.

13. The connector assembly according to claim 12 wherein the cap is secured to the vehicle part by a cord.

14. The connector assembly according to claim 8 wherein the electrical connector includes an insulative housing, and wherein the insulative housing is secured within the modular unit in a snap-type fit.

15. An on-board charge port connector assembly for charging a battery pack associated with an electrical vehicle, said on-board connector assembly being rigidly secured within an opening in a body part of the vehicle, said on-board connector assembly comprising:

an electrical connector, said electrical connector including a plurality of electrical terminals that are electrically connected to the battery pack; and a modular unit secured within the opening in the body part, said modular unit including an internal bore, said internal bore including a first internal bore portion having a first diameter and a second internal bore portion having a second diameter wherein the second diameter is larger than the first diameter so as to form a shoulder therebetween, said first internal bore portion receiving the electrical connector in a secure engagement, said modular unit further including a lip portion radially extending from an edge of one end of the modular unit and a plurality of biasing members, wherein the lip portion seats against an outer surface of a rim area of the body part defining the opening and each of the biasing members are positioned in contact with the inner surface of the rim area so as to secure the on-board charge port assembly within the opening.

16. The connector assembly according to claim 15 wherein the first internal bore portion includes a tab portion circumferentially positioned within the first internal bore portion, said tab portion receiving a front surface of a housing associated with the electrical connector so as to position the electrical connector within the modular unit at a desirable location.

17. The connector assembly according to claim 15 wherein the first internal bore portion includes a threaded portion proximate to the shoulder, said threaded portion receiving a threaded cap so as to enclose terminals associated with the electrical connector.

18. The connector assembly according to claim 17 wherein the cap is secured to the vehicle part by a cord.

* * * * *